United States Patent
Xu

(10) Patent No.: US 12,446,073 B2
(45) Date of Patent: Oct. 14, 2025

(54) METHOD AND APPARATUS FOR RECEIVING VOICE PACKET, TERMINAL, MEDIUM, AND COMPUTER PROGRAM

(71) Applicant: GUANGDONG OPPO MOBILE TELECOMMUNICATIONS CORP., LTD., Dongguan (CN)

(72) Inventor: Chaojie Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 334 days.

(21) Appl. No.: 18/224,095

(22) Filed: Jul. 20, 2023

(65) Prior Publication Data
US 2023/0362998 A1  Nov. 9, 2023

Related U.S. Application Data

(63) Continuation of application No. PCT/CN2021/128476, filed on Nov. 3, 2021.

(30) Foreign Application Priority Data

Jan. 22, 2021  (CN) .......................... 202110089577.4

(51) Int. Cl.
*H04W 74/0816* (2024.01)
*H04L 65/1069* (2022.01)
*H04W 84/12* (2009.01)

(52) U.S. Cl.
CPC ..... *H04W 74/0816* (2013.01); *H04L 65/1069* (2013.01); *H04W 84/12* (2013.01)

(58) Field of Classification Search
CPC ............. H04W 74/0816; H04W 84/12; H04W 52/0206; H04W 52/0216; H04W 52/0219;
(Continued)

(56) References Cited

U.S. PATENT DOCUMENTS 11,523,306 B1 * 12/2022 Chu ..................... H04L 69/324
2005/0018624 A1   1/2005 Meier et al.
(Continued)

FOREIGN PATENT DOCUMENTS

| CN | 103533664 A | 1/2014 |
| CN | 110662278 A | 1/2020 |

(Continued)

OTHER PUBLICATIONS

The third office action issued in corresponding CN application No. 202110089577.4 dated Dec. 23, 2024. 12 pages.
International Search Report and Written Opinion dated Dec. 27, 2021 in International Application No. PCT/CN2021/128476. English translation attached.
(Continued)

*Primary Examiner* — Hashim S Bhatti
(74) *Attorney, Agent, or Firm* — Sheppard, Mullin, Richter & Hampton LLP

(57) ABSTRACT

Provided are a method and apparatus for receiving a voice packet, a terminal, a medium, and a computer program, belonging to the technical field of communication. After the wireless voice VoWiFi service is successfully established, an individual target wake-up time (iTWT) between a wireless access point AP and a workstation can be established based on an interaction period of the voice packet of the service. After the iTWT between the workstation and the AP is established, the workstation can automatically enter the wake-up state to receive voice packet when reaching the iTWT time period. Since the TWT mechanism is introduced in the VoWiFi service, the workstation can receive the voice packet transmitted by the wireless access point AP after being awakened on time by the iTWT. The workstation can be awakened on time without transmitting an identification frame to the wireless access point after being awakened.

18 Claims, 7 Drawing Sheets

(58) Field of Classification Search
CPC .......... H04W 52/0235; H04W 52/028; H04W 76/28; H04W 52/0248; H04L 65/1069; H04L 65/65; H04L 65/80
See application file for complete search history.

(56) References Cited

U.S. PATENT DOCUMENTS

| | | | |
|---|---|---|---|
| 2019/0253967 A1 | 8/2019 | Xiao et al. | |
| 2019/0306790 A1 | 10/2019 | Kottontavida et al. | |
| 2020/0221381 A1* | 7/2020 | Homchaudhuri | ........................... H04W 52/0235 |
| 2023/0389078 A1* | 11/2023 | Baron | ............... H04W 74/0816 |

FOREIGN PATENT DOCUMENTS

| | | |
|---|---|---|
| CN | 111417182 A | 7/2020 |
| CN | 111970735 A | 11/2020 |
| WO | 2019014371 A1 | 1/2019 |

OTHER PUBLICATIONS

Extended European Search Report received in European Patent Application No. EP21920683.6 dated Jun. 28, 2024.
The Second Office Action from corresponding Chinese Application No. CN202110089577.4 dated Aug. 22, 2024.
The First Office Action from corresponding Chinese Application No. 202110089577.4, dated Jan. 25, 2024. English translation attached.
Rejection decision issued in corresponding CN application No. 202110089577.4 dated Mar. 31, 2025. 12 pages.

\* cited by examiner

METHOD AND APPARATUS FOR RECEIVING VOICE PACKET, TERMINAL, MEDIUM, AND COMPUTER PROGRAM

CROSS-REFERENCE TO RELATED APPLICATIONS

The present application is a continuation of International Application No. PCT/CN2021/128476, filed on Nov. 3, 2021, which claims priority to Chinese patent application No. 202110089577.4, filed on Jan. 22, 2021. The disclosures of the aforementioned applications are hereby incorporated by reference in their entireties.

FIELD

Embodiments of the present disclosure relate to the field of communication technology, and particularly, to a method and apparatus for receiving a voice packet, a terminal, a medium, and a computer program.

BACKGROUND

Voice over Wi-Fi, wireless voice (VoWiFi) is a technology of voice call service provided by the operator by means of providing an access to the core network via a Wireless Fidelity (WiFi) network.

Among related technologies, the VoWiFi technology transmits voice packet to workstation periodically via Access Point (AP), i.e., a wireless access node. Before receiving the voice packet, the workstation transmits an identification frame with a specified value to the AP, to remind the AP of that the workstation is ready to receive the voice packet. After the workstation has received the voice packet, the workstation may transmit another identification frame with a specified value to the AP, to indicate that the AP itself enters a dormant state and no longer receive the voice packet. In this way, the reception of a voice packet is completed.

SUMMARY

Embodiments of the present disclosure provides a method and apparatus for receiving a voice packet, a terminal, a medium, and a computer program. The technical solutions are as follows.

According to one aspect of the present disclosure, a method for receiving a voice packet in a workstation is provided. The method includes: obtaining, subsequent to establishing a Voice over Wi-Fi (VoWiFi) service with an access node, an interaction period of a voice packet of the VoWiFi service provided by the access node; establishing an individual target wake-up time (iTWT) with the access node, and determining the interaction period as a time period of the iTWT; and automatically entering, in response to reaching the time period of the iTWT, an awake state to receive the voice packet of the VoWiFi service.

According to another aspect of the present disclosure, a method for transmitting a voice packet in an access node is provided. The method includes: providing, subsequent to establishing a VoWiFi service with a workstation, the workstation with an interaction period of a voice packet of the VoWiFi service; establishing an iTWT with the workstation, and determining the interaction period as a time period of the iTWT; and transmitting, in response to reaching the time period of the iTWT, the voice packet of the VoWiFi service to the workstation.

According to another aspect of the present disclosure, a workstation is provided. The workstation includes a processor, a memory connected to the processor, and at least one program instruction stored on the memory. The instruction is loaded and executed by the processor to implement a method for receiving a voice packet. The method includes: obtaining, subsequent to establishing a VoWiFi service with an access node, an interaction period of a voice packet of the VoWiFi service provided by the access node; establishing an iTWT with the access node, and determining the interaction period as a time period of the iTWT; and automatically entering, in response to reaching the time period of the iTWT, an awake state to receive the voice packet of the VoWiFi service.

According to another aspect of the present disclosure, a wireless access node is provided. The wireless access node includes a processor and a memory. The memory has at least one instruction stored thereon. The instruction is loaded and executed by the processor to implement a method for transmitting a voice packet. The method includes: providing, subsequent to establishing a VoWiFi service with a workstation, the workstation with an interaction period of a voice packet of the VoWiFi service; establishing an iTWT with the workstation, and determining the interaction period as a time period of the iTWT; and transmitting, in response to reaching the time period of the iTWT, the voice packet of the VoWiFi service to the workstation.

According to another aspect of the present disclosure, a computer readable storage medium is provided. The computer readable storage medium has a program instruction stored thereon. The program instruction, when being executed by a processor, implements the method for receiving the voice packet in the workstation according to the present disclosure.

According to another aspect of the present disclosure, a computer readable storage medium is provided. The computer readable storage medium has a program instruction stored thereon. The program instruction, when being executed by a processor, implements the method for transmitting the voice packet in the AP according to the present disclosure.

According to another aspect of the present disclosure, a computer program is provided. The computer program includes a computer instruction stored on a computer readable storage medium. The computer instruction is read by a processor of a computer device from the computer readable storage medium, and the processor executes the computer instruction to implement the method for receiving the voice packet described in at least one embodiment.

According to another aspect of the present disclosure, a computer program is provided. The computer program includes a computer instruction stored on a computer readable storage medium. The computer instruction is read by a processor of a computer device from the computer readable storage medium, and the processor executes the computer instruction to implement the method for transmitting the voice packet described in at least one embodiment.

BRIEF DESCRIPTION OF THE DRAWINGS

In order to clearly describe the technical solutions in the embodiments of the present disclosure, the drawings used in the description of the embodiments of the present disclosure are briefly described below. Apparently, the drawings described below merely illustrate some of the embodiments of the present disclosure. Those of ordinary skill in the art may further obtain other drawings based on these drawings without creative efforts.

DETAILED DESCRIPTION

Figure 1:
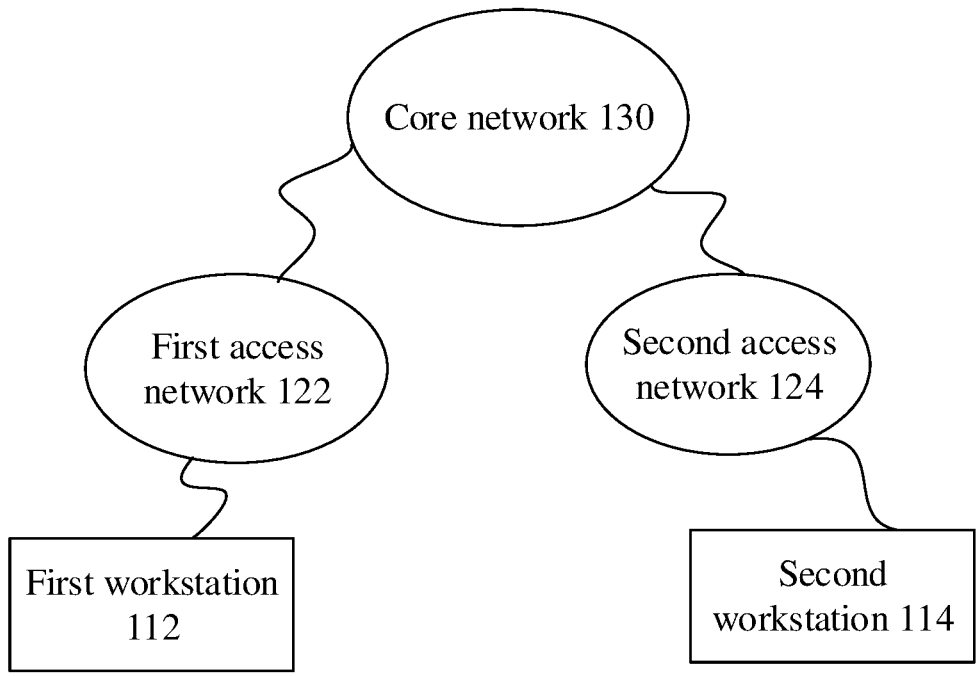
FIG. 1 is a schematic diagram of a VoWiFi service architecture according to an embodiment of the present disclosure.

In order to clarify the purpose, technical solutions and advantages of the present disclosure, the embodiments of the present disclosure will be described in detail in connection with the accompanying drawings.

In the following description relates to the accompanying drawings, the same numerals in different accompanying drawings indicate the same or similar elements, unless otherwise indicated. The implementations described in the following exemplary embodiments do not represent all the implementations in consistence with the present disclosure. In contrast, they are only examples of apparatuses and methods that are consistent with some aspects of the present disclosure as detailed in the claims.

In the present disclosure, it should be understood that the terms "first", "second", etc. are used for descriptive purposes only and are not to be construed as indicating or implying relative importance. In the present disclosure, it should be noted that the term "connection" or "connected" shall be construed in a broad sense, for example, a fixed connection, a detachable connection, or an integral connection; a mechanical connection, or an electrical connection; a direct connection, or an indirect connection via an intermediate medium. For those of ordinary skill in the art, the specific meaning of the above terms in the present disclosure can be understood in specific cases. In addition, in the present disclosure, unless otherwise specified, "plurality of" means two or more. The phrase "and/or" is intend to describe the associated relationships of the associated objects, indicating three possible relationships. For example, "A and/or B" indicate: A exists alone, both A and B exist, and B exists alone. The character "/" generally indicates that the associated objects before and after the character have an "or" relationship.

The present disclosure provides a method for receiving a voice packet in a workstation. The method includes: obtaining, subsequent to establishing a Voice over Wi-Fi (VoWiFi) service with an access node, an interaction period of a voice packet of the VoWiFi service provided by the access node; establishing an individual target wake-up time with the access node, and determining the interaction period as a time period of the iTWT; and automatically entering, in response to reaching the time period of the iTWT, an awake state to receive the voice packet of the VoWiFi service.

In at least one embodiment, said establishing the iTWT with the access node, and determining the interaction period as the time period of the iTWT includes: transmitting an establishment request of the iTWT to the access node, the establishment request comprising the interaction period and a service period of the iTWT; and determining, in response to receiving an establishment permission of the iTWT from the access node, the interaction period as the time period of the iTWT.

In at least one embodiment, the method further includes: setting the service period of the iTWT based on a predetermined parameter in the workstation.

In at least one embodiment, the method further includes: receiving a first identification frame transmitted by the access node; and determining, in response to that the first identification frame includes an identification of the workstation, a target moment carried by the first identification frame as a starting moment of the time period of the iTWT.

In at least one embodiment, the method further includes: transmitting, in response to that a duration subsequent to successfully receiving the voice packet within the service period of the iTWT is longer than a predetermined threshold, a second identification frame to the access node, and entering a dormant state, the second identification frame being configured to indicate that the workstation has entered the dormant state.

In at least one embodiment, the second identification frame is at least one of a power management frame, a null data frame, and a service quality frame.

In at least one embodiment, the time period of the iTWT is timed by a hardware timer of the workstation.

The present disclosure further provides a method for transmitting a voice packet in an access node. The method includes: providing, subsequent to establishing a VoWiFi service with a workstation, the workstation with an interaction period of a voice packet of the VoWiFi service; establishing an iTWT with the workstation, and determining the interaction period as a time period of the iTWT; and transmitting, in response to reaching the time period of the iTWT, the voice packet of the VoWiFi service to the workstation.

In at least one embodiment, said establishing the iTWT with the workstation, and determining the interaction period as the time period of the iTWT includes: receiving an establishment request of the iTWT transmitted by the workstation, the establishment request comprising the interaction period and a service period of the iTWT; transmitting, in response to the establishment request, an establishment permission of the iTWT to the workstation; and determining the interaction period as the time period of the iTWT, and setting the service period of the iTWT.

In at least one embodiment, the method further includes: transmitting a first identification frame to the workstation, the first identification frame comprising an identification of the workstation and a target moment, and the target moment being configured to indicate a starting moment of the time period the iTWT.

In at least one embodiment, the method further includes: receiving a second identification frame transmitted by the workstation, the second identification frame being configured to indicate that the workstation has entered a dormant state; and stopping transmitting data to the workstation.

In at least one embodiment, the second identification frame is at least one of a power management frame, a null data frame, and a service quality frame.

In at least one embodiment, the time period of the iTWT is timed by a hardware timer of the access node.

In the present disclosure, after the wireless voice VoWiFi service is successfully established, the individual TWT (iTWT) between the workstation and the AP can be established based the interaction period of the voice packet of the VoWiFi service. After the iTWT between the workstation and the AP is established, the workstation can automatically enter the awake state to receive the voice packet after reaching the time period of the iTWT. Since the TWT mechanism is introduced in the VoWiFi service in the present disclosure, the workstation can receive the voice packet transmitted by the wireless access point AP after being awakened on time by the iTWT. That is, the workstation can be awakened on time without transmitting an identification frame to the wireless access point after being awakened, thereby reducing the interaction operations between the workstation and the AP. In this way, the power consumption of the workstation and a delay time of receiving the voice packet can be reduced.

In order to explain the solutions illustrated in the present disclosure embodiment, several terms appearing in the embodiments of the present disclosure are introduced below.

Wireless voice VoWiFi service indicates a VoWiFi-based voice call service.

FIG. 1 is a schematic diagram of a VoWiFi service architecture according to an embodiment of the present disclosure. FIG. 1 illustrates a first workstation (Station, STA) 112, a second workstation 114, a first access network 122, a second access network 124, and a core network 130.

The first workstation 112 and the second workstation 114 can both be mobile terminals used by users, through which users make voice call.

During operation of a communication network illustrated in FIG. 1, the first workstation 112 transmits a voice call request with the second workstation 114 to the core network 130 through the first access network 122 corresponding to the first workstation 112. The core network 130 processes the voice call request. The core network 130 establishes a voice call service with the second workstation 114 through the second access network 124 corresponding to the second workstation 114. The first access network 122 is a WiFi network. In at least one embodiment, the second access network 124 may also be a WiFi network.

Thus, the wireless voice VoWiFi service can be intuitively regarded as a voice call service for accessing the core network through a WiFi network and provided and charged by the operator running the core network. In the VoWiFi service, since the interaction process at the side of the first workstation 112 is similar as the interaction process at the side of the second workstation 114, the method for receiving a voice packet of VoWiFi service with reduced power consumption and delay provided by the present disclosure is described in the present embodiment by means of a process of receiving voice packet by the workstation on one side.

Target Wakeup Time (TWT) is a mechanism designed to support energy-saving operation in large-scale Internet of Things environment. The TWT first appeared in the documentation of a communication standard IEEE 802.11ah "WiFi HaLow". As the standard evolved to the IEEE 802.11ax version, the functionality of the TWT mechanism was further expanded. In the IEEE 802.11ax standard, the TWT mechanism can support trigger-based uplink transmission.

In the TWT implementation mechanism, a schedule is established between the workstation and the AP. The schedule is obtained through negotiation between the workstation and the AP. The schedule is composed of time periods of the TWT. In some application scenarios, the schedule may include one or more beacon periods. When the TWT time period is reached, the workstation can be awakened, wait for a trigger frame from the AP, and perform a data exchange. When the current transmission is completed, the workstation can enter the dormant state. It should be noted that the TWT time period between different workstations and APs may be negotiated between the workstations and the APs, and the corresponding iTWT (individual TWT) is negotiated between the specified workstation and AP.

For example, a possible implementation of the time period of the iTWT between the AP and the first workstation is described below by means of an example.

Refer to Table 1, Table 1 illustrates possible data for the time period of the iTWT established between the AP and the first workstation.

TABLE 1

| Time period No. | 1-st time period | 2-nd time period | 3-rd time period | ... | n-th time period |
|---|---|---|---|---|---|
| Starting and ending moments | [50, 70) | [70, 90) | [110, 130) | ... | [30 + 20n, 50 + 20n) |

It should be noted that the time periods obtained through negotiation between the first workstation and the AP illustrated in Table 1 have the identical length, i.e., 20 milliseconds, where n is a positive integer. In a practical application scenario, n is a constant term with a definite value. The starting and ending moments illustrated in Table 1 are system times after the common alignment time in the AP and the first workstation. The system time can be either the same or different from the time used by an international timing center, which is not limited herein.

In each time period in Table 1, when the system time of the first workstation reaches the starting moment of each time period, the first workstation can enter an awake state and receive the voice packet.

Table 2 and Table 3 illustrate iTWTs negotiated between the AP and the second workstation and between the same AP and the third workstation, respectively.

TABLE 2

| Time period No. | 1-st time period | 2-nd time period | 3-rd time period | ... | n-th time period |
|---|---|---|---|---|---|
| Starting and ending moments | [22, 37) | [37, 52) | [52, 67) | ... | [7 + 15n, 22 + 15n) |

TABLE 3

| Time period No. | 1-st time period | 2-nd time period | 3-rd time period | ... | n-th time period |
|---|---|---|---|---|---|
| Starting and ending moments | [15, 45) | [45, 75) | [105, 135) | ... | [30n − 15, 30n + 15) |

The data illustrated in Table 2 and Table 3 reveal that the time periods of iTWT negotiated between the of different workstations and the same AP are data independent of each other. Each workstation and AP can operate based on the time period negotiated therebetween, thereby enabling the workstation to exert the communication function of receiving voice packet from the AP.

The present disclosure can be applied on both sides, i.e., the AP and the workstation. For example, a hardware structure of the AP and a hardware structure of the workstation are described below, respectively.

Figure 2:
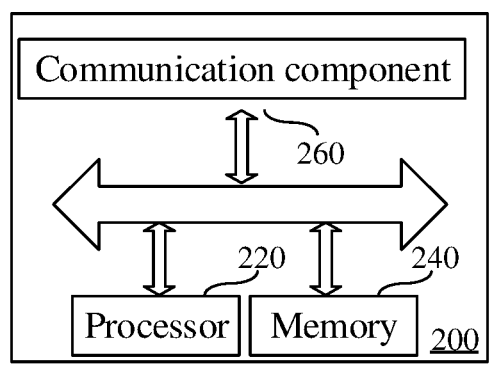
FIG. 2 is a structural block diagram of a workstation provided by an exemplary embodiment of the present disclosure.

Referring to FIG. 2, FIG. 2 a structural block diagram of a workstation provided by an exemplary embodiment of the present disclosure. As illustrated in FIG. 2, the workstation includes a processor 220, a memory 240, and a communication component 260. The memory 240 has at least one instruction stored thereon. The instruction can be loaded and executed by the processor 220 to implement the method for receiving a voice packet as described in the respective embodiments of the present disclosure.

In the present disclosure, after the wireless voice VoWiFi service is successfully established, and after the workstation 200 establishes the wireless voice VoWiFi service with the access node, the workstation 20 obtains the interaction period of a voice packet of the VoWiFi service provided by the access node; the workstation 20 establishes the iTWT with the access node, the interaction period being used as the time period of the iTWT; and when reaching the time period of the iTWT, the workstation 20 automatically enter the awake state to receive the voice packet of the VoWiFi service.

The processor 220 may include one or more processing cores. The processor 220 is connected to the respective parts within the entire workstation 200 by means of various interfaces and lines, and it can implement various functions of the workstation 200 and process data by running or executing instructions, programs, code sets, or instruction sets stored in the memory 240 and by calling data stored in the memory 240. In at least one embodiment, the processor 220 may be implemented in at least one of the hardware forms of a digital signal processing (DSP), a field-programmable gate array (FPGA), a programmable logic array (PLA). The processor 220 may be integrated with one or more of the central processing unit (CPU), graphics processing unit (GPU), and modem, or combinations thereof. The CPU is primarily configured to process the operating system, user interface, applications, etc.; the GPU is configured to implement the rendering and drawing of the content to be displayed on the display; and the modem is configured to process wireless communication. It can be understood that the above-mentioned modem may also be embodied as a separate chip without being integrated in the processor 220.

The memory 240 may include Random Access Memory (RAM) or Read-Only Memory (ROM). In at least one embodiment, the memory 240 may include non-transitory computer-readable storage medium. The memory 240 may be configured to store instructions, programs, code, code sets, or instruction sets. The memory 240 may include a program-storing area and a data-storing area. The program-storing area may store instructions for implementing an operating system, instructions for at least one function (e.g., touch function, audio playing function, image displaying function, etc.), and instructions for implementing the respective method embodiments described below, etc. The data-storing area may store data involved in the respective method embodiments described below, etc.

The communication component 260 may be a component including a radio-frequency assembly and a baseband chip. The communication component 260 can receive or transmit information through an air interface. In this example, the communication component 260 of the workstation can communicate with the AP. For example, a unicast communication channel is established between the workstation and the AP, and the AP transmits voice packet to the workstation. Accordingly, the workstation may also transmit the voice packet required to be transmitted to the AP.

For example, the workstation illustrated in the embodiments of the present disclosure may include devices such as a cell phone, a tablet computer, a laptop computer, smart glasses, a smart watch, a digital camera, an MP4 player terminal, an MP5 player terminal, a learning machine, a finger reader, an electric reader, or an electronic dictionary.

Figure 3:
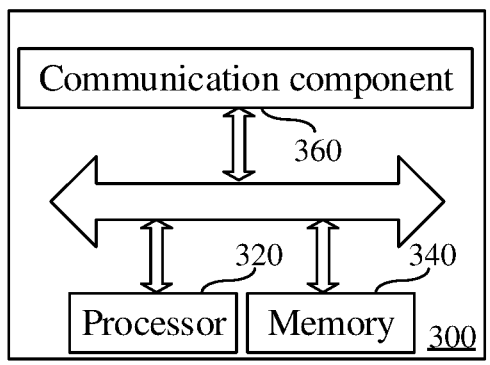
FIG. 3 is a structural block diagram of an AP provided by an exemplary embodiment of the present disclosure.

Referring to FIG. 3, FIG. 3 is structural block diagram of an AP provided by an exemplary embodiment of the present disclosure. As illustrated in FIG. 3, the AP includes a processor 320, a memory 340, and a communication component 360. The memory 340 has at least one instruction stored thereon. The instruction can be loaded and executed by the processor 320 to implement a method for receiving a voice packet as described in the respective embodiments of the present disclosure.

In the present disclosure, after the wireless voice VoWiFi service is successfully established, and after the AP 300 establishes the wireless voice VoWiFi service with the workstation, the AP 300 provides the workstation with an interaction period of a voice packet of the VoWiFi service; the AP 300 establishes an iTWT with the workstation, the interaction period being used as a time period of the iTWT; and in response to reaching the time period of the iTWT, the AP 300 transmits the voice packet of the VoWiFi service to the workstation.

The processor 320 may include one or more processing cores. The processor 320 is connected to the respective parts within the entire AP 300 by means of various interfaces and lines, and it can implement various functions of the AP 300 and process data by running or executing instructions, programs, code sets, or instruction sets stored in the memory 340 and by calling data stored in the memory 340. In at least one embodiment, the processor 320 may be implemented in at least one of the hardware forms of DSP, FPGA, PLA. The processor 320 may be integrated with one or more of CPU, GPU, and modem, or combinations thereof. The CPU is primarily configured to process the operating system, user interface, applications, etc.; the GPU is configured to implement the rendering and drawing of the content to be displayed on the display; and the modem is configured to process wireless communication. It can be understood that the above-mentioned modem may also be embodied as a separate chip without being integrated in the processor 320.

The memory 340 may include Random Access Memory (RAM) or Read-Only Memory (ROM). In at least one embodiment, the memory 340 may include non-transitory computer-readable storage medium. The memory 340 may be configured to store instructions, programs, code, code sets, or instruction sets. The memory 340 may include a program-storing area and a data-storing area. The program-storing area may store instructions for implementing an operating system, instructions for at least one function (e.g., touch function, audio playing function, image displaying function, etc.), and instructions for implementing the respective method embodiments described below, etc. The data-storing area may store data involved in the respective method embodiments described below, etc.

The communication component 360 may be a component including a radio-frequency assembly and a baseband chip. The communication component 360 can receive or transmit information through an air interface. In this example, the communication component 360 of the AP can communicate with the workstation. Meanwhile, the communication component 360 of the AP can also communicate with the network in the core network, to obtain voice packet from the core network or upload the voice packet transmitted to the workstation to the core network.

For example, the AP illustrated in the embodiments of the present disclosure may typically include a housing and one or more antennas extended out of the housing. The antenna is a part of the radio-frequency assembly of the communication component 360 as described above.

Based on the hardware device illustrated in FIG. 2 and FIG. 3 above, the embodiments of the present disclosure provide a method for receiving a voice packet applied in a workstation, and a method for transmitting a voice packet applied in an AP. For details, please refer to the following description.

Figure 4:
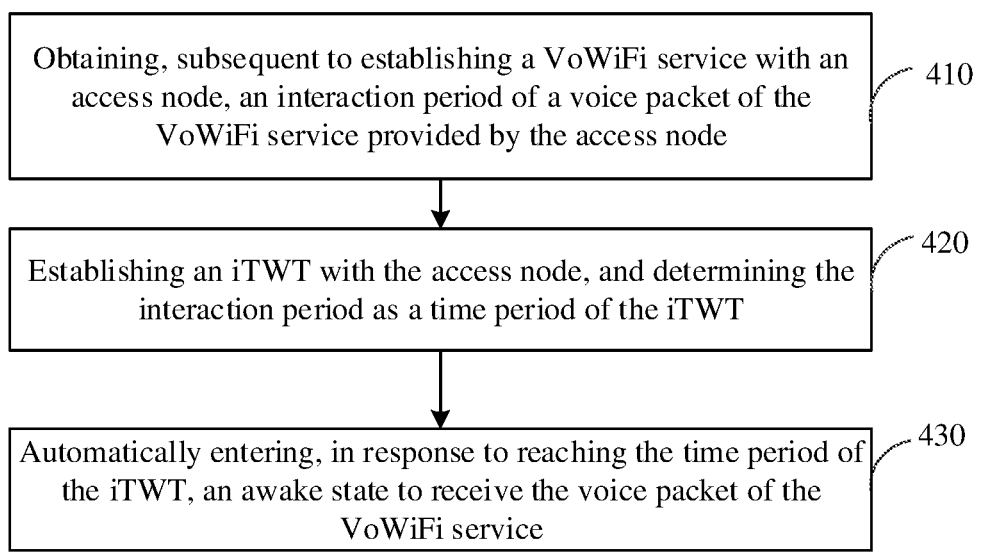
FIG. 4 is a flow chart of a method for receiving a voice packet in a workstation provided by an exemplary embodiment of the present disclosure.

FIG. 4 is a flow chart of a method for receiving a voice packet in a workstation provided by an exemplary embodiment of the present disclosure. The receiving voice packet method can be applied in the workstation as illustrated in FIG. 2 above. In FIG. 4, the method for receiving a voice packet includes the following action in blocks.

At block 410, after establishing the wireless voice VoWiFi service with the access node, an interaction period of a voice packet of the VoWiFi service provided by the access node is obtained.

In the embodiments of the present disclosure, the workstation first establishes the wireless voice VoWiFi service with the access node AP. Subsequently, when the VoWiFi service between the workstation and the AP is successfully established, the workstation can obtain the interaction period of the voice packet of the VoWiFi service provided by the access node.

For example, the workstation can establish the VoWiFi service with the access node AP in advance. In a process of establishing the VoWiFi service, the workstation may establish a connection with the AP capable of using VoWiFi service through the WiFi network. For example, when the AP does not have connection passwords, the workstation may directly establish a WiFi connection with the AP. When the AP has connection passwords, the workstation can establish the WiFi connection with the corresponding AP by means of Service Set Identifier (SSID) and the corresponding passwords.

After the workstation successfully establishes the WiFi connection with the corresponding AP, the workstation can use the VoWiFi service in two ways.

In the first way, the workstation is installed with a third-party VoWiFi application, through which the user can dial the number of other workstations that need to be connected to voice call. The third-party VoWiFi application is used to establish the VoWiFi service.

In the second way, the workstation itself has a system native VoWiFi application, and users can directly input the number of other workstations on the workstation's native dialing interface without activating a separate third-party VoWiFi application. The native VoWiFi application in the workstation can automatically establish the VoWiFi service after the number is acquired.

Figure 5:
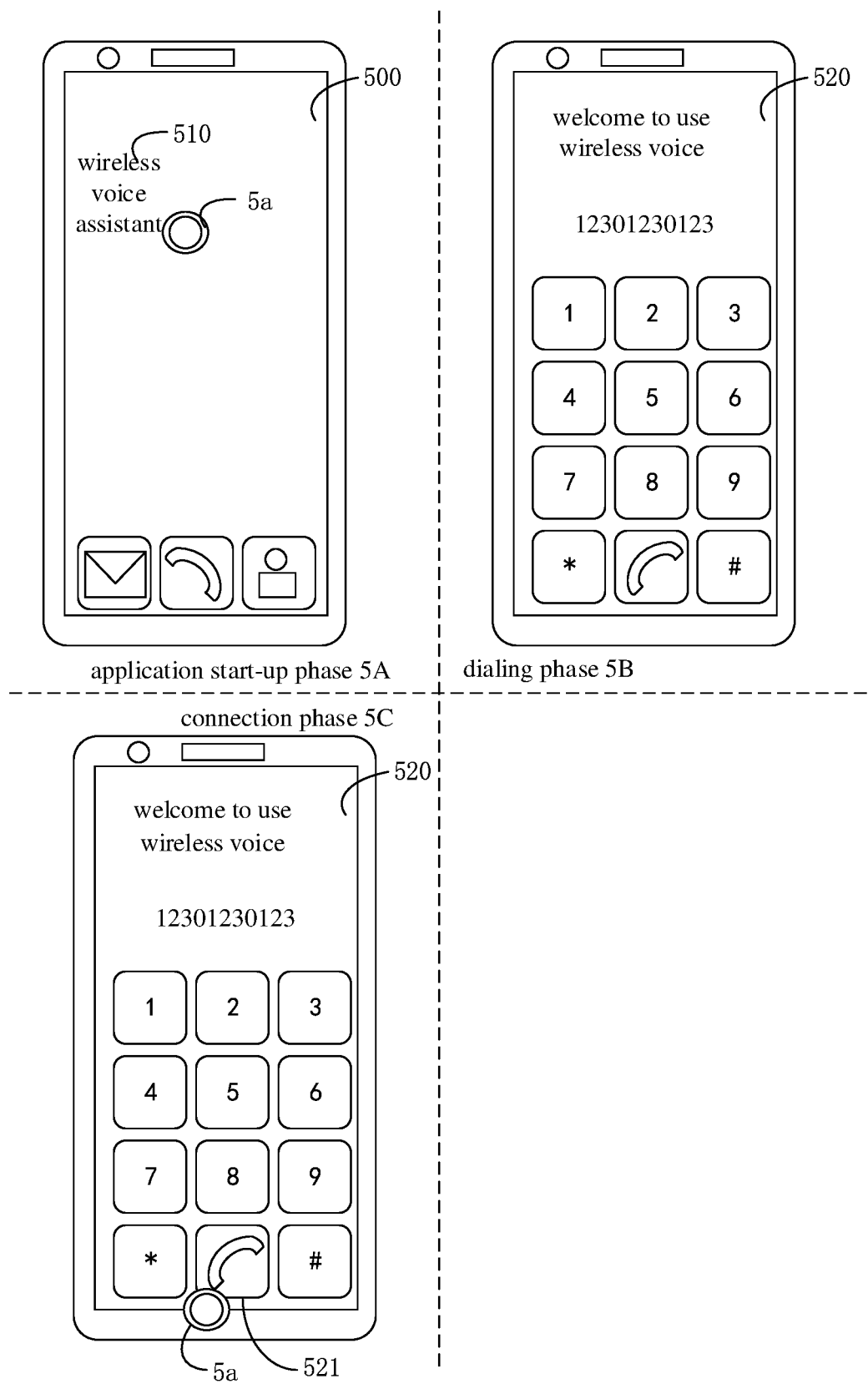
FIG. 5 is a schematic diagram of a voice call process through a third-party VoWiFi application according to the embodiment illustrated in FIG. 4.

FIG. 5 is a schematic diagram of a voice call process through a third-party VoWiFi application according to the embodiment illustrated in FIG. 4. FIG. 5 illustrates an application start-up phase 5A, a dialing phase 5B, and a connection phase 5C. In the application start-up phase 5A, the user's finger taps a start-up icon 510 of the third-party VoWiFi application on a display screen 500, thereby generating a trigger signal, and the workstation starts the third-party VoWiFi application in response to the trigger signal. The position of the contact is 5a, which is indicated by concentric circles in the FIG. 5. In the dialing phase 5B, the workstation inputs the communication number "12301230123" on the dialing interface 520 provided by the third-party VoWiFi application. Next, in the connection phase 5C, the user's finger clicks on a dialing button 521 on the dialing interface 520 to generate a dialing signal, and the workstation establishes a VoWiFi service with the AP in response to the dialing signal to.

Figure 6:
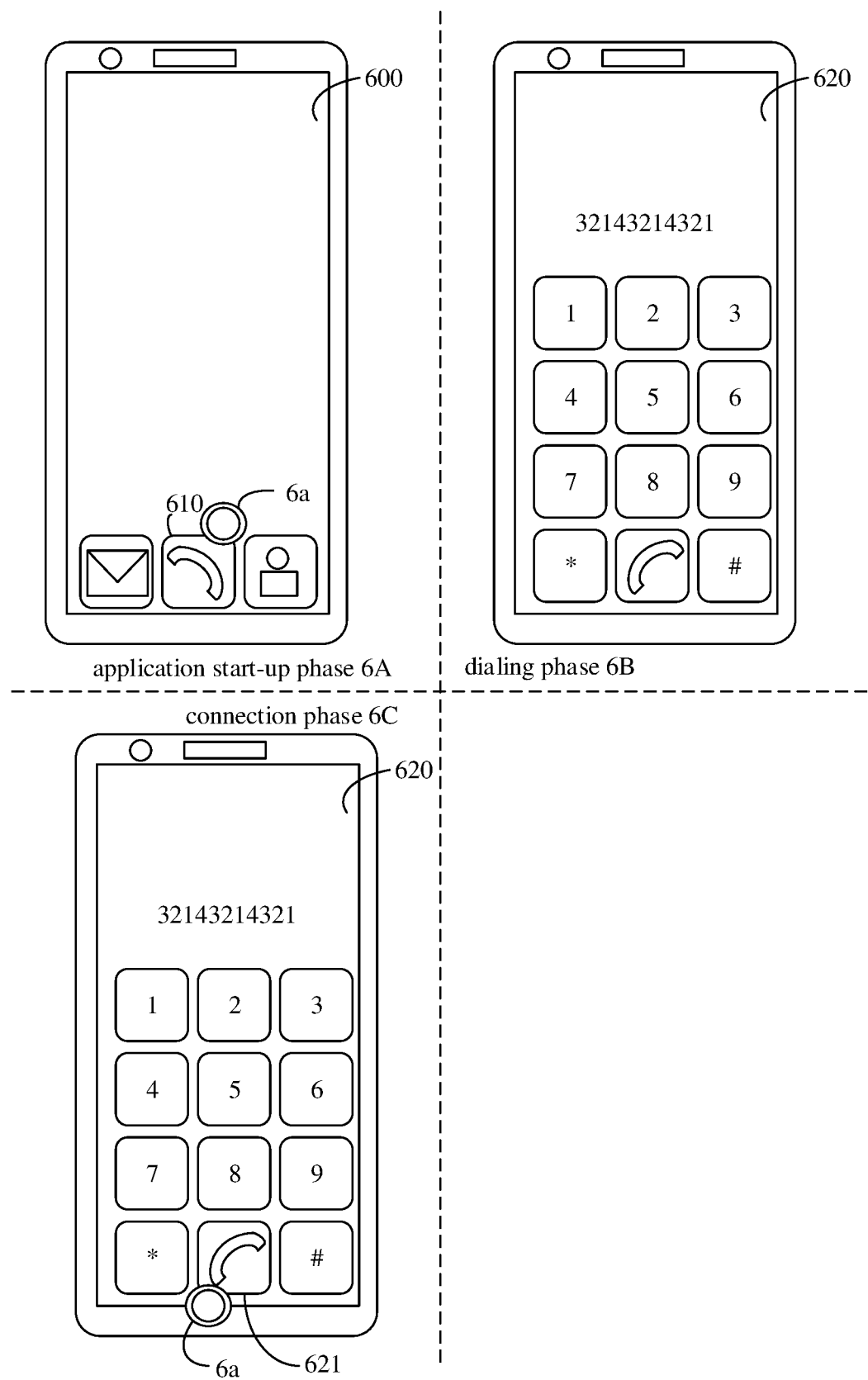
FIG. 6 is a schematic diagram of a voice call process through a system native VoWiFi application according to the embodiment illustrated in FIG. 4.

FIG. 6 is a schematic diagram of a voice call process through a system native VoWiFi application according to the embodiment illustrated in FIG. 4. FIG. 6 illustrates an application start-up phase 6A, a dialing phase 6B, and a connection phase 6C. In the application start-up phase 6A, a user's finger taps a start-up icon 610 of the system native phone application on the display screen 600, and the workstation starts the native phone application in response to the trigger signal. The location of the finger click is denoted with concentric circles 6A. Further, in the dialing phase 6B, the workstation inputs the communication number "32143214321" on the dialing interface 620 provided by the system native VoWiFi application. Next, in the connection phase 6C, the user's finger clicks a dialing button 621 on the dialing interface 620, and the workstation establishes a VoWiFi service in the background according to a predetermined condition, enabling the workstation to successfully establish the VoWiFi service with the AP. It is to be noted that the predetermined condition can be that the VoWiFi service is established when the signal quality of the WiFi network predetermined by the user is better than the specified signal strength or when the geographical location is in the predetermined area. It can be understood that since the prices of VoWiFi service and other voice call services may vary greatly in different countries or regions, users may usually set the condition of establishing VoWiFi service to be whether the current geographic location is in the predetermined area.

In the present disclosure, when the workstation successfully establishes the VoWiFi service with the AP, the workstation can obtain the interaction period of the voice packet of the VoWiFi service provided by the access node.

In a possible implementation, the interaction period of the voice packet of the VoWiFi service can be a parameter transmitted directly from the AP to the workstation, and the workstation can read the parameter from a specified location. In this scenario, the interaction period of the voice packet may be a parameter calculated by the AP, or a parameter calculated by a network element in the core network.

In another possible implementation, the interaction period of the voice packet of the VoWiFi service can be the data calculated by the workstation based on the relevant parameter transmitted by the AP. It should be noted that the formula for calculating the interaction period of the voice packet is the data stored in the workstation in advance. When the workstation needs to calculate the interaction period of the voice packet, the workstation may input relevant parameters into the pre-stored formula for calculation and determine the calculation result as the interaction period of the voice packet.

At block 420, an iTWT is established with the access node, and the interaction period is used as the time period of the iTWT.

Based on the interaction period of the voice packet of the VoWiFi service, which is obtained in the previous step, the workstation uses this interaction period as the time period of the iTWT to establish the iTWT between the AP and the workstation. It should be noted that, since the iTWT is only applicable to two devices, this workstation and the designated AP, the time period of the iTWT may be saved for this workstation and the designated AP. If the value of the interaction period is 20 milliseconds, the workstation may use the 20 milliseconds as the time period of the iTWT, and establish the iTWT between the workstation and the AP based on the time period of 20 milliseconds.

At block 430, in response to reaching the time period of the iTWT, the workstation automatically enters the awake state to receive the voice packet of VoWiFi service.

The time period of the iTWT acts on both the AP and the workstation. That is, for the AP, when reaching the time period of the iTWT, instead of additional data interaction with the workstation, the AP can directly transmit the voice packet of the VoWiFi service to the workstation. Correspondingly, for the workstation, when reaching the time period of the iTWT, the workstation enters the awake state to receive voice packet of the VoWiFi service.

Due to the presence of the time period of the iTWT, the workstation, after entering the awake state, can start receiving the voice packet of VoWiFi service directly, instead of transmitting data such as identification frames to the AP. Thus, the workstation saves the power and time required to transmit the identification frame. In this way, the solutions provided by the present disclosure can not only reduce the time delay of receiving the voice packet of the VoWiFi service, but also reduce the power consumption of the workstation. Therefore, the time delay and the power consumption can be simultaneously reduced in the process of receiving the voice packet of the VoWiFi-based services, thereby improving the overall performance of the VoWiFi service.

It should be understood that, in the present disclosure, the AP and the workstation are required to be aligned in terms of time, allowing the time of the timers in the AP and the workstation to be synchronized. In the embodiments of the present disclosure, the workstation uses a hardware timer to time the time period of the iTWT. In this case, the hardware timer is based on such a principle that a duration of an action performed by a single logical element is known in advance and the current time can be known by counting the number of actions performed by the single logical element.

It should be noted that a software timer is based on the principle of counting the number of times of a single line of codes running in the CPU. Due to an instability of CPU resources, a duration of executing a single line of codes is unstable and errors often occur. In this scenario, the more times the current line of code is run, the more unstable the software timer becomes. In contrast, the error of the software timer may be more significant than that of the hardware timer.

In summary, in the method for receiving the voice packet provided in the present disclosure, after the wireless voice VoWiFi service is successfully established, the interaction period of the voice packet of the VoWiFi service provided by the access node can be obtained; by determining the interaction period as a time period of the iTWT, the iTWT with the access node can be established; when the iTWT between the workstation and the AP is established, the workstation can automatically enter the awake state to receive the voice packet after reaching the time period of the iTWT. Since the TWT mechanism is introduced in the VoWiFi service in the present disclosure, the workstation, after being awakened, is not required to transmit identification frame to remind the AP of that the workstation itself is awakened, thereby reducing the interactions between the workstation and the AP. In this way, the power consumption of the workstation and a delay time of receiving the voice packet can be reduced.

On the other hand, the present disclosure further provides a method for receiving a voice packet applied in the AP, which is described below.

Figure 7:
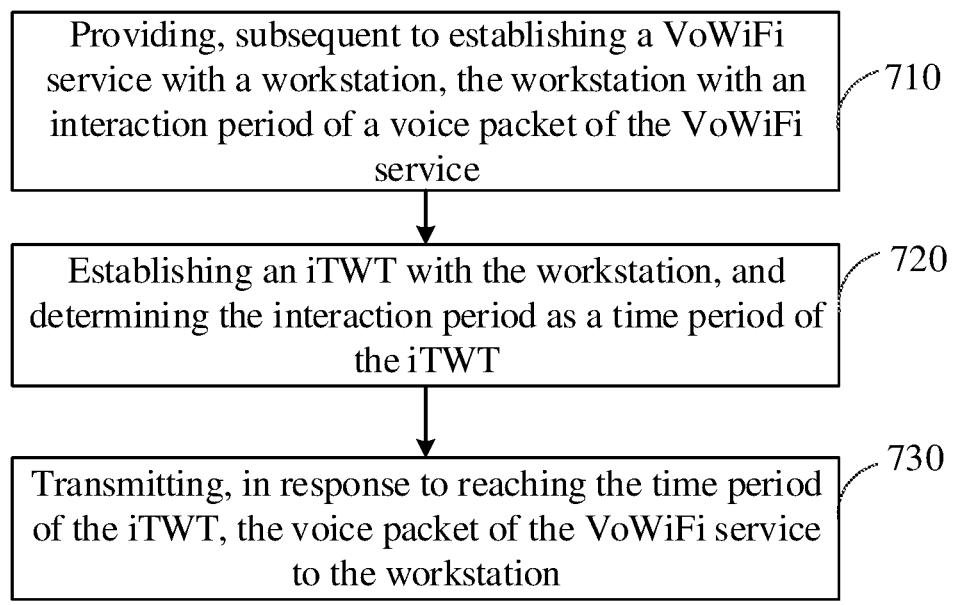
FIG. 7 is a flow chart of a method for transmitting a voice packet in an access node provided by an exemplary embodiment of the present disclosure.

FIG. 7 is a flow chart of a method for transmitting a voice packet in an access node provided by an exemplary embodiment of the present disclosure. The method for transmitting the voice packet can be applied in the AP as illustrated in FIG. 3. In FIG. 7, the method for transmitting the voice packet includes the following actions in blocks.

At block 710, after a wireless voice VoWiFi service with the workstation is established, the workstation is provided an interaction period of a voice packet of the VoWiFi service.

In this example, after the wireless voice VoWiFi service is successfully established, the AP may decide how to transmit the voice packet to the workstation based on whether the interaction period of the voice packet is the calculated data. When the interaction period of the voice packet is the calculated data, the AP directly transmits the interaction period of the voice packet to the workstation. When the interaction period of the voice packet is still required to be calculated, the AP transmits the relevant parameters to the workstation, allowing the workstation to calculate the interaction period of the voice packet based on the relevant parameters.

At block 720, an iTWT is established with the workstation, and the interaction period is used as the time period of the iTWT.

In this example, the AP may use the interaction period of the voice packet of the VoWiFi service as the time period of the iTWT and establish the iTWT between the AP and the workstation based on the time period of the iTWT.

At block 730, in response to reaching the time period of the iTWT, the voice packet of the VoWiFi service is transmitted to the workstation.

When the system time in the AP reaches the time period of the iTWT, the AP transmits the voice packet of the VoWiFi service to the workstation.

It should be noted that, in the present disclosure, the AP and the workstation are required to be aligned in terms of time, allowing the time of the timers in the AP and the workstation to be synchronized. In the embodiment of the present disclosure, the AP uses a hardware timer to time the time period of the iTWT. The hardware timer is based on such a principle that a duration of an action performed by a single logical element is known in advance and the current time can be known by counting the number of actions performed by the single logical element. Since the time of each logical action is more accurate in the hardware timer, the hardware timer is more accurate than the software timer.

It should be noted that a software timer is based on the principle of counting the number of times of a single line of codes running in the CPU. Due to an instability of CPU resources, a duration of executing a single line of codes is unstable and errors often occur. In this scenario, the more times the current line of code is run, the more unstable the software timer becomes. When calculating the same length time, the error of the software timer may be more significant than that of the hardware timer.

It should be noted that the execution of actions in blocks 710 to 730 involves operations and terms corresponding to the workstation on the opposite side, which can refer to the description in combination with FIG. 4 and are not repeated herein.

In summary, the method for transmitting the voice packet provided in the present disclosure allows the AP to directly transmit the voice packet of the VoWiFi service based on the pre-negotiated time period of the iTWT, without receiving the identification frame uploaded by the workstation, thereby eliminating the process of uploading the identification frame by the workstation. Therefore, the time that the AP waits for the identification frame can be shortened, and the delay of the workstation receiving the voice packet of the VoWiFi service can be reduced.

Based on the solution disclosed in the previous embodiment, the workstation and the AP are also able to cooperate with each other and implement the process of receiving voice packet by referring to the following embodiment.

Figure 8:
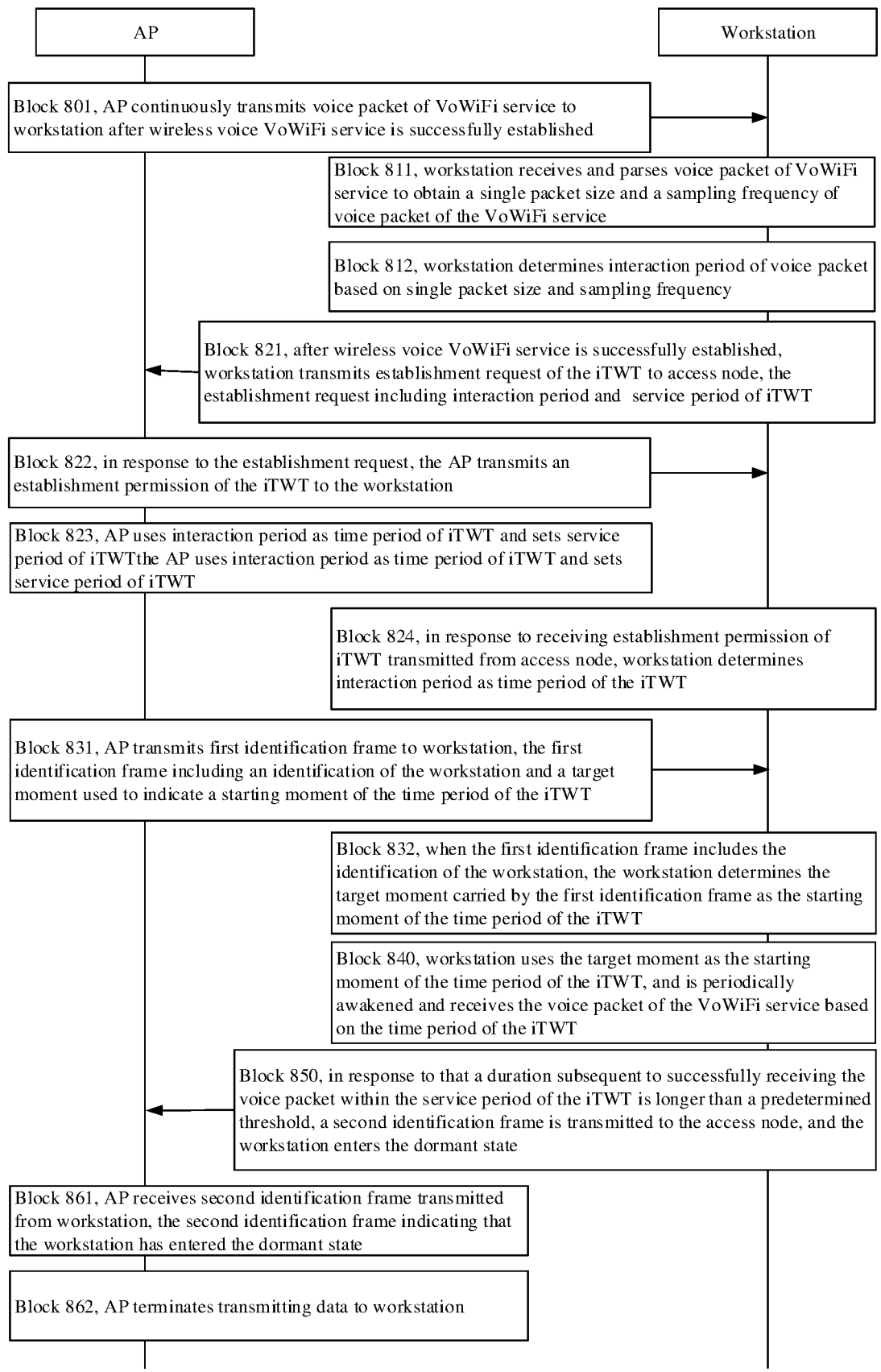
FIG. 8 is a flow chart of another method for receiving a voice packet provided by another exemplary embodiment of the present disclosure.

FIG. 8 is a flow chart of another method for receiving a voice packet provided by another exemplary embodiment of the present disclosure. The method for receiving the voice packet can be applied to the above-mentioned workstation and AP. In FIG. 8, the method for receiving the voice packet includes the following actions in blocks.

At block 801, the AP continuously transmits the voice packet of the VoWiFi service to the workstation after the wireless voice VoWiFi service is successfully established.

At block 811, the workstation receives and parses the voice packet of the VoWiFi service to obtain a single packet size and a sampling frequency of the voice packet of the VoWiFi service.

In the embodiment of the present disclosure, the workstation may continuously receive the voice packet of the VoWiFi service from the AP and parses the voice packet to obtain the single packet size and the sampling frequency of the voice packet. For example, the single packet size and the sampling frequency can be either values determined by the predetermined parameter in the core network or values determined by the AP independently according to the current network quality, which are not specifically limited in the embodiments of the present disclosure.

The single packet size can be measured in bytes. In some application scenarios, the single packet size may be 160 bytes, 140 bytes, 180 bytes, or 200 bytes. The above data are merely illustrative and do not constitute limitations on the embodiments of the present disclosure.

The sampling frequency is used to indicate a clarity of a voice call. When the sampling frequency is relatively high, the clarity of the voice call is also relatively high. When the sampling frequency is relatively low, the clarity of the voice call is also relatively low. In other words, the sampling frequency is positively correlated with the clarity of the voice call. In some application scenarios, the sampling frequency may be 8 KHz, 5 KHz, 10 KHz, or 12 KHz. The above data are merely illustrative and do not constitute limitations on the embodiments of the present disclosure.

At block 812, the workstation determines the interaction period of the voice packet based on the single packet size and the sampling frequency.

The interaction period of the voice packet may be determined in such a manner that the quotient of the single packet size divided by the sampling frequency is determined to be the interaction period of the voice packet.

It should be noted that the workstation, after obtaining the single packet size and the sampling frequency, can directly calculate the interaction period of the voice packet in the above-mentioned manner. For example, when the packet size is 160 bytes and the sampling frequency is 8 KHz, the workstation can obtain a quotient of 0.02 seconds by dividing 160 bytes by 8 KHz, and the workstation determines thus quotient as the interaction period of the voice packet. That is, the interaction period of the voice packet determined in this example is 0.02 seconds, or the interaction period of the voice packet determined in this example is 20 milliseconds.

At block 821, after the wireless voice VoWiFi service is successfully established, the workstation transmits an establishment request of the iTWT to the access node. The establishment request includes the interaction period and a service period of the iTWT.

Accordingly, the AP receives the establishment request of the iTWT transmitted by the workstation, and the establishment request includes the interaction period and the service period of the iTWT.

In the embodiment of the present disclosure, in order to establish the iTWT between the workstation and the AP, the workstation transmits the establishment request of the iTWT. The establishment request includes the interaction period of the iTWT as well as the service period. In at least one embodiment, the interaction period is greater than the service period. In at least one embodiment, the interaction period may be divided into a service period and a non-service period.

In at least one embodiment, the service period of the iTWT may be a predetermined parameter in the workstation. The workstation may set the service period of the iTWT based on the predetermined parameter in the workstation. For example, the service period may be a specified value such as 2 milliseconds, 3 milliseconds, or 5 milliseconds.

At block 822, in response to the establishment request, the AP transmits an establishment permission of the iTWT to the workstation.

In the embodiments of the present disclosure, when the AP transmits the establishment permission of the iTWT to the workstation in response to the establishment request, the AP is already able to establish the iTWT based on the interaction period and the service period of the iTWT.

At block 823, the AP uses the interaction period as the time period of the iTWT and sets the service period of the iTWT.

At block 824, in response to receiving the establishment permission of the iTWT transmitted from the access node, the workstation determines the interaction period as the time period of the iTWT.

In the present disclosure, through the above-mentioned actions in blocks, the VoWiFi service is successfully established between the workstation and the access node, and the iTWT mechanism is established. Subsequently, the process of transmitting and receiving voice packet of the VoWiFi service via the iTWT mechanism can be completed between the workstation and the access node through the following actions in blocks.

At block 831, the AP transmits a first identification frame to the workstation. The first identification frame includes an identification of the workstation and a target moment used to indicate a starting moment of the time period of the iTWT.

In at least one embodiment, the first identification frame may be a Delivery Traffic Indication Message (DTIM) Beacon frame or a TIM Beacon frame. When the first identification frame is the DTIM Beacon frame, the workstation is forced to be awakened to receive the data frame and check whether the data bit corresponding to the workstation in the bit map of the identification frame is 1. When the data bit corresponding to the workstation is 1, the workstation considers that the first identification frame includes the identification of the workstation.

It should be noted that the first identification frame may further carry the target moment, which is later than a transmitting moment of the first identification frame. In at least one embodiment, if the first identification frame takes t1 to be transmitted from the AP to the workstation, the designer may set the target moment to be ΔT after the first identification frame is transmitted. When the transmitting moment of the first identification frame is Target Beacon Transmission Time (TBTT), the target moment can be TBTT+ΔT. where the ΔT is greater than t1.

Accordingly, the workstation receives the first identification frame transmitted by the access node AP.

At block 832, when the first identification frame includes the identification of the workstation, the workstation determines the target moment carried by the first identification frame as the starting moment of the time period of the iTWT.

In this example, since the iTWT is a protocol negotiated between two devices, i.e., the workstation and the AP, the selection of the starting moment is part of the preparation for the complete implementation of this scheme. The workstation may identify the contents in the first identification frame. When the first identification frame includes the identification of the workstation, the workstation may receive the target moment carried by the first identification frame as the starting moment of the time period of the iTWT.

At block 840, the workstation uses the target moment as the starting moment of the time period of the iTWT, and is periodically awakened and receives the voice packet of the VoWiFi service based on the time period of the iTWT.

Accordingly, the access node AP also transmits the received voice packet of the VoWiFi service periodically based on the time period of the iTWT with the target moment as the starting moment of the time period of the iTWT.

At block 850, in response to that a duration subsequent to successfully receiving the voice packet within the service period of the iTWT is longer than a predetermined threshold, a second identification frame is transmitted to the access node, and the workstation enters the dormant state. The second identification frame is configured to indicate that the workstation has entered the dormant state.

In the embodiment of the present disclosure, the workstation and the access node AP can complete a transmission of a voice packet of the VoWiFi service during one time period of the iTWT. For example, the target moment is t0, the time period of the iTWT is 20 milliseconds, the service period of the iTWT is 10 milliseconds, and the iTWT enters the service period whenever reaching a new time period of the iTWT. For example, when the system moments of both the workstation and the AP reach t0, the AP transmits the voice packet to the workstation. At this moment, the iTWT enters the service period of the iTWT, the AP completes transmitting the voice packet to the workstation in the service period of 10 milliseconds. At the end of the 10 milliseconds service period, the time period of the iTWT has 10 milliseconds of non-service period left. At the end of the non-service period of 10 milliseconds, the time cycle of the current iTWT ends and the next time period of the iTWT begins.

In at least one embodiment, the workstation in the awake state may continue to consume energy during the service period of the iTWT. Therefore, the present disclosure further provides a solution for entering the dormant state earlier without affecting the reception of the voice packet. For example, if the predetermined threshold is 2 milliseconds and the workstation finished the receiving of the voice packet within 3 milliseconds after the begin of the service period, the workstation transmits the second identification frame to the access node at 5 milliseconds and enters the dormant state. Thus, in this scenario, when the workstation has finished the receiving of the voice packet and the service period has not yet ended, the workstation can enter the dormant state earlier, thereby further saving power consumption.

At block 861, the AP receives the second identification frame transmitted from the workstation. The second identification frame is configured to indicate that the workstation has entered the dormant state.

At block 862, the AP terminates transmitting data to the workstation.

In at least one embodiment, the workstation has received the voice packet of the VoWiFi service in the single packet size completely, and at this moment, the workstation considers the voice packet to have been received successfully. The timing starts from the moment when the voice packet is completely, when the duration after said timing is longer than the first threshold and the current system moment is still within to the service period of the iTWT, the second identification frame is transmitted to the AP, and the workstation enters the dormant state. For example, the time period of the iTWT is 20 milliseconds, and the service period of the iTWT is the first 10 milliseconds of the 20 milliseconds. The workstation successfully receives the voice packet at the end of the 5-th millisecond and the timing starts. If the system moment is still within the first 10 milliseconds of the service period of the iTWT 3 milliseconds later, the workstation transmits the second identification frame to the AP and enters the dormant state. In this example, the first threshold is equal to 3 milliseconds. Instead of being in the awake state all the way through the service period of the iTWT, the workstation enters the dormant state earlier after the workstation finishes the receiving of the voice packet. Therefore, the embodiments of the present disclosure can further reduce the power consumption of the workstation while ensuring the voice call quality.

In at least one embodiment, a TWT Service Period (TWT SP) can also be set in the iTWT. In the TWT SP, the workstation is in the awake state. For example, when the time period of the iTWT is 20 milliseconds, this TWT SP may be the first 10 milliseconds of the 20 milliseconds. In this scenario, the AP transmits data to the workstation within the first 10 milliseconds of the 20 milliseconds, and the workstation is in the dormant state by default and transmits no more data within the last 10 milliseconds of the 20 milliseconds The second identification frame is at least one of a power management frame, a null data frame, and a service quality frame. For example, the power management frame is a PM frame, a PM bit may actually take a value of 0. The null data frame is a NULL data frame. The service quality frame is a QoS data frame. It should be noted that the second identification frame may also be other data frames or other control frames, which are not limited in the embodiments of the present disclosure.

Figure 9:
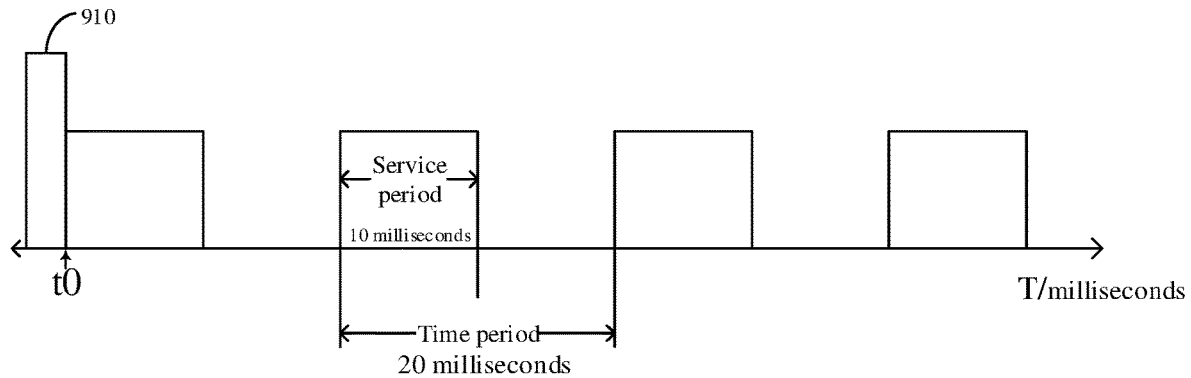
FIG. 9 is a schematic diagram of operations on a time axis of a received voice packet based on the embodiment illustrated in FIG. 8.

For example, the method for receiving the voice packet provided by the present disclosure is described in a landing scenario. FIG. 9 is a schematic diagram of operations on a time axis of a received voice packet based on the embodiment illustrated in FIG. 8. In FIG. 9, the workstation receives a first identification frame 910 at a first moment t0 and operates with a time period of the iTWT of 20 milliseconds from the first moment t0. The TWT SP is set to be the first 10 milliseconds from the start of the time period between the AP and the workstation. Whenever the system time in the AP reaches the time period of the iTWT, the AP transmits a voice packet destined for the workstation to the workstation. Whenever the system time in the workstation reaches the time period of the iTWT, the workstation ensures that the workstation is in the awake state to receive the voice packet transmitted by the AP. It should be noted that the workstation requires a specified period of time Δt to transition from the dormant state to the wake state. Therefore, the workstation needs to perform an awakening operation from the dormant state starting at Δt before reaching each time period of the iTWT, in order to ensure that the workstation is truly in the awake state when reaching the time period of the iTWT.

In summary, in the embodiments of the present disclosure, the value of the interaction period of receiving voice packet is determined as the time period of the iTWT, such that the workstation is no longer required to transmit the identification frame to the AP after each awakening of the workstation by means of the TWT mechanism, thereby saving the interaction process and reducing the power consumption of the workstation and the time delay for receiving a voice packet.

In at least one embodiment, in this embodiment, the single packet size and the sampling frequency of the voice packet of the VoWiFi service transmitted by the AP can also be received, and the quotient of the single packet size divided by the sampling frequency is used as the interaction period of the voice packet. With such a method for dynamically determining the interaction period, a time period applicable to the actual service situation of the current voice packet can be established when establishing the iTWT, allowing the workstation and the AP to flexibly adjust the iTWT established therebetween based on the voice packet of the VoWiFi service, thereby expanding the application scenarios of the solutions provided by the present disclosure.

In at least one embodiment, the moment when the first identification frame is transmitted by the AP may be determined as the starting moment, to allow the AP and the workstation to know a reference moment of the TWT in the present disclosure, enabling the smooth implementation of the process of receiving voice packet.

In at least one embodiment, the time period of the iTWT can be calculated by the hardware timer, so that the solutions have more accurate timing capability compared with the solutions of application software timer known in related art, thereby reducing the time error when the AP transmits the voice packet to the workstation.

Figure 10:
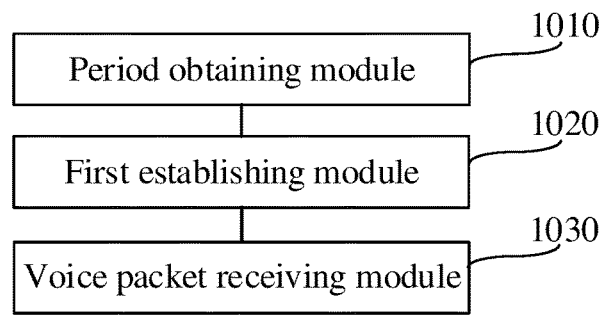
FIG. 10 is a structural block diagram of an apparatus for receiving a voice packet provided by an exemplary embodiment of the present disclosure.

An example of the apparatus embodiment of the present disclosure is described below. The apparatus can be configured to perform the method embodiments of the present disclosure applied in the workstation. For details not disclosed in the device embodiment of the present disclosure, please refer to the method embodiments of the present disclosure Referring to FIG. 10, FIG. 10 is a structural block diagram of an apparatus for receiving a voice packet provided by an exemplary embodiment of the present disclosure. The apparatus for receiving a voice packet may be implemented as all or part of a workstation in the form of a software, a hardware, or a combination thereof. The apparatus includes a period obtaining module 1010, a first establishing module 1020, and a voice packet receiving module 1030.

The period obtaining module 1010 is configured to obtain, subsequent to establishing a VoWiFi service with an access node, an interaction period of a voice packet of the VoWiFi service provided by the access node.

The first establishing module 1020 is configured to establish an iTWT with the access node, and determine the interaction period as a time period of the iTWT.

The voice packet receiving module 1030 is configured to automatically enter, in response to reaching the time period of the iTWT, an awake state to receive the voice packet of the VoWiFi service.

In at least one embodiment, the first establishing module 1020 is configured to: transmit the establishment request of the iTWT to the access node, the establishment request including the interaction period and the service period of the iTWT; determining, in response to receiving the establishment permission of the iTWT transmitted by the access node, the interaction period as the time period of the iTWT.

In at least one embodiment, the apparatus further includes a setting module, and the setting module is configured to set the service period of the iTWT based on the predetermined parameters in the workstation.

In at least one embodiment, the apparatus further includes a second receiving module and a start moment acquisition module. The second receiving module is configured to receive a first identification frame transmitted by the access node. The start moment acquisition module is configured to determine, in response to that the first identification frame includes an identification of the workstation, a target moment carried by the first identification frame as a starting moment of the time period of the iTWT.

In at least one embodiment, the apparatus further includes a first processing module, and the first processing module is configured to transmit, in response to that a duration subsequent to successfully receiving the voice packet within the service period of the iTWT is longer than a predetermined threshold, a second identification frame to the access node, and enter a dormant state. The second identification frame being configured to indicate that the workstation has entered the dormant state.

In at least one embodiment, the second identification frame involved in the apparatus includes at least one of a power management frame, a null data frame, and a service quality frame.

In at least one embodiment, the apparatus is applied in a workstation using a hardware timer to time the time period of the iTWT.

In summary, in the apparatus for receiving the voice packet provided in the present disclosure, after the wireless voice VoWiFi service is successfully established, the interaction period of the voice packet of the VoWiFi service provided by the access node can be obtained, and an iTWT between the AP and the workstation is established by determining the interaction period as the time period of the iTWT. After the iTWT between the workstation and the AP is established, the workstation can automatically enter the awake state to receive the voice packet after reaching the time period of the iTWT. Since the TWT mechanism is introduced in the VoWiFi service in the present disclosure, after the workstation is awakened, the workstation is no longer required to transmit the identification frame to the AP to remind the AP of that the workstation itself is awakened, thereby saving the interaction operations between the workstation and the AP. In this way, the power consumption of the workstation and the time delay for receiving a voice packet can be reduced.

Figure 11:
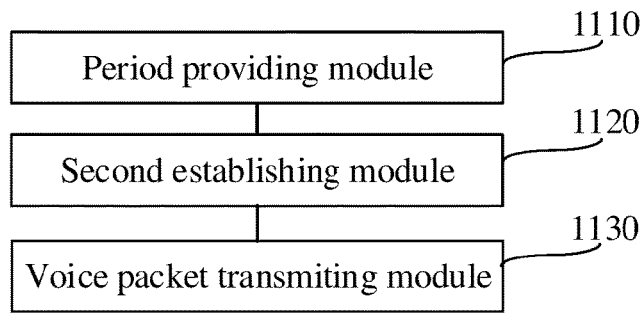
FIG. 11 is a structural block diagram of an apparatus for transmitting a voice packet provided by an exemplary embodiment of the present disclosure.

Referring to FIG. 11, FIG. 11 is a structural block diagram of an apparatus for transmitting a voice packet provided by an exemplary embodiment of the present disclosure. The apparatus for transmitting the voice packet may be implemented as all or part of a wireless access node AP in the form of a software, a hardware, or a combination thereof. The apparatus includes a period providing module 1110, a second establishing module 1120, and a voice packet transmitting module 1130.

The period providing module 1110 is configured to provide, subsequent to establishing a VoWiFi service with a workstation, the workstation with an interaction period of a voice packet of the VoWiFi service.

The second establishing module 1120 is configured to establish an iTWT with the workstation, and determine the interaction period as a time period of the iTWT.

The voice packet transmitting module 1130 is configured to transmit, in response to reaching the time period of the iTWT, the voice packet of the VoWiFi service to the workstation.

In at least one embodiment, the second establishing module 1120 is configured to: receive an establishment request of the iTWT transmitted by the workstation, the establishment request including the interaction period and a service period of the iTWT; transmit, in response to the establishment request, an establishment permission of the iTWT to the workstation; and determine the interaction period as the time period of the iTWT, and setting the service period of the iTWT.

In at least one embodiment, the apparatus further includes an identification frame transmitting module configured to transmit a first identification frame to the workstation. The first identification frame includes an identification of the workstation and a target moment. The target moment is configured to indicate a starting moment of the time period the iTWT.

In at least one embodiment, the apparatus further includes a third receiving module and a second processing module. The third receiving module is configured to receive a second identification frame transmitted by the workstation. The second identification frame is configured to indicate that the workstation has entered a dormant state. The second processing module is configured to stop transmitting data to the workstation.

In at least one embodiment, the second identification frame involved in the apparatus includes at least one of a power management frame, a null data frame, and a service quality frame.

In at least one embodiment, the apparatus is applied in an access node AP using a hardware timer to time the time period of the iTWT.

In summary, the apparatus for receiving the voice packet provided in the present disclosure allows the AP to directly transmit the voice packet of the VoWiFi service based on the pre-negotiated time period of the iTWT, without receiving the identification frame uploaded by the workstation, thereby eliminating the process of uploading the identification frame by the workstation. Therefore, the time that the AP waits for the identification frame can be shortened, and the delay of the workstation receiving the voice packet of the VoWiFi service can be reduced.

An embodiment of the present disclosure further provides a computer readable medium having at least one instruction stored thereon. The at least one instruction can be loaded and executed by a processor to implement the method for receiving the voice packet applied in the workstation as described in the above embodiments.

An embodiment of the present disclosure further provides a computer readable medium having at least one instruction stored thereon. The at least one instruction can be loaded and executed by the processor to implement the method for receiving the voice packet applied in the AP as described in the above embodiments.

It should be noted that the apparatus for receiving the voice packet provided in the above embodiments performs the method for receiving the voice packet, and the division of the respective functional modules is illustrative. In practical applications, the above functions can be assigned to different functional modules as needed, i.e., the internal structure of the apparatus can be divided into different functional modules to perform all or some of the above described functions. In addition, the apparatus for receiving the voice packet provided by the above embodiment belongs to the same concept as the method embodiment for receiving the voice packet, and its specific implementations are described in detail in the method embodiment, which are not repeated herein.

The above embodiments of the present disclosure are numbered for the purpose of description only, and do not represent the advantages or disadvantages of the embodiments.

Those skilled in the art can understand that all or part of the actions for implementing the above embodiments can be accomplished by a hardware, or by a program to instruct the relevant hardware to complete, and the program may be stored in the computer-readable storage medium. The above-mentioned storage medium can be read-only memory, disk or CD-ROM, etc.

The above mentioned embodiment are only exemplary embodiments of the present disclosure and are not intended to limit the present disclosure. Any modification, equivalent replacement, improvement, etc. made within the spirit and principles of the present disclosure shall fall within the scope of protection of the present disclosure.

What is claimed is:

1. A method for receiving a voice packet in a workstation, the method comprising:
    obtaining, subsequent to establishing a Voice over Wi-Fi (VoWiFi) service with an access node, an interaction period of a voice packet of the VoWiFi service provided by the access node;
    establishing an individual target wake-uptime (iTWT) with the access node, and determining the interaction period as a time period of the iTWT; and
    automatically entering, in response to reaching the time period of the iTWT, an awake state to receive the voice packet of the VoWiFi service;
    wherein said establishing the iTWT with the access node, and determining the interaction period as the time period of the iTWT comprises:

transmitting an establishment request of the iTWT to the access node, the establishment request comprising the interaction period and a service period of the iTWT; and determining, in response to receiving an establishment permission of the iTWT from the access node, the interaction period as the time period of the iTWT;

transmitting, in response to that a duration subsequent to successfully receiving the voice packet within the service period of the iTWT is longer than a predetermined threshold, a second identification frame to the access node, and entering a dormant state, the second identification frame being configured to indicate that the workstation has entered the dormant state.

2. The method according to claim 1, further comprising: setting the service period of the iTWT based on a predetermined parameter in the workstation.

3. The method according to claim 1, further comprising: receiving a first identification frame transmitted by the access node; and determining, in response to that the first identification frame includes an identification of the workstation, a target moment carried by the first identification frame as a starting moment of the time period of the iTWT.

4. The method according to claim 1, wherein, the second identification frame is at least one of a power management frame, a null data frame, and a service quality frame.

5. The method according to claim 1, wherein the time period of the iTWT is timed by a hardware timer of the workstation.

6. A method for transmitting a voice packet in an access node, the method comprising:

providing, subsequent to establishing a VoWiFi service with a workstation, the workstation with an interaction period of a voice packet of the VoWiFi service;

establishing an iTWT with the workstation, and determining the interaction period as a time period of the iTWT; and transmitting, in response to reaching the time period of the iTWT, the voice packet of the VoWiFi service to the workstation;

wherein said establishing the iTWT with the access node, and determining the interaction period as the time period of the iTWT comprises:

transmitting an establishment request of the iTWT to the access node, the establishment request comprising the interaction period and a service period of the iTWT; and determining, in response to receiving an establishment permission of the iTWT from the access node, the interaction period as the time period of the iTWT;

transmitting, in response to that a duration subsequent to successfully receiving the voice packet within the service period of the iTWT is longer than a predetermined threshold, a second identification frame to the access node, and entering a dormant state, the second identification frame being configured to indicate that the workstation has entered the dormant state.

7. The method according to claim 6, wherein said establishing the iTWT with the workstation, and determining the interaction period as the time period of the iTWT comprising:

receiving an establishment request of the iTWT transmitted by the workstation, the establishment request comprising the interaction period and a service period of the iTWT;

transmitting, in response to the establishment request, an establishment permission of the iTWT to the workstation; and determining the interaction period as the time period of the iTWT, and setting the service period of the iTWT.

8. The method according to claim 6, further comprising: transmitting a first identification frame to the workstation, the first identification frame comprising an identification of the workstation and a target moment, and the target moment being configured to indicate a starting moment of the time period the iTWT.

9. The method according to claim 7, further comprising: receiving a second identification frame transmitted by the workstation, the second identification frame being configured to indicate that the workstation has entered a dormant state; and stopping transmitting data to the workstation.

10. The method according to claim 9, wherein the second identification frame is at least one of a power management frame, a null data frame, and a service quality frame.

11. The method according to claim 7, wherein the time period of the iTWT is timed by a hardware timer of the access node.

12. A workstation, comprising:

a processor;

a memory connected to the processor; and a program instruction stored on the memory, wherein the processor, when executing the program instruction, implements a method for receiving a voice packet, the method comprising:

obtaining, subsequent to establishing a VoWiFi service with an access node, an interaction period of a voice packet of the VoWiFi service provided by the access node;

establishing an iTWT with the access node, and determining the interaction period as a time period of the iTWT; and automatically entering, in response to reaching the time period of the iTWT, an awake state to receive the voice packet of the VoWiFi service;

wherein said establishing the iTWT with the access node, and determining the interaction period as the time period of the iTWT comprises:

transmitting an establishment request of the iTWT to the access node, the establishment request comprising the interaction period and a service period of the iTWT; and determining, in response to receiving an establishment permission of the iTWT from the access node, the interaction period as the time period of the iTWT;

transmitting, in response to that a duration subsequent to successfully receiving the voice packet within the service period of the iTWT is longer than a predetermined threshold, a second identification frame to the access node, and entering a dormant state, the second identification frame being configured to indicate that the workstation has entered the dormant state.

13. The workstation according to claim 12, wherein said establishing the iTWT with the access node, and determining the interaction period as the time period of the iTWT comprises:

transmitting an establishment request of the iTWT to the access node, the establishment request comprising the interaction period and a service period of the iTWT; and determining, in response to receiving an establishment permission of the iTWT from the access node, the interaction period as the time period of the iTWT.

14. A wireless access node, comprising:
a processor;
a memory connected to the processor; and
a program instruction stored on the memory,
wherein the processor, when executing the program instruction, implements the method for transmitting the voice packet according to claim 6.

15. A non-transitory computer readable storage medium, having a program instruction stored thereon, wherein the program instruction, when being executed by a processor, implements the method for receiving the voice packet according to claim 1.

16. A non-transitory computer readable storage medium, having a program instruction stored thereon, wherein the program instruction, when being executed by a processor, implements the method for transmitting the voice packet according to claim 6.

17. A non-transitory computer program, comprising a computer instruction stored on a computer readable storage medium, wherein: the computer instruction is read by a processor of a computer device from the computer readable storage medium; and the processor executes the computer instruction to cause the computer device to implement the method for receiving the voice packet according to claim 1.

18. A non-transitory computer program, comprising a computer instruction stored on a computer readable storage medium, wherein: the computer instruction is read by a processor of a computer device from the computer readable storage medium; and the processor executes the computer instruction to cause the computer device to implement the method for transmitting the voice packet according to claim 6.

* * * * *